(12) United States Patent
Kamvysselis et al.

(10) Patent No.: US 6,839,763 B1
(45) Date of Patent: Jan. 4, 2005

(54) SYSTEM AND METHOD FOR EXPEDITING TRANSFER OF DATA FROM A LOCAL STORAGE FACILITY TO A REMOTE STORAGE FACILITY

(75) Inventors: Peter Kamvysselis, Boston, MA (US); Dan Arnon, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 905 days.

(21) Appl. No.: 09/804,479

(22) Filed: Feb. 28, 2001

(51) Int. Cl.[7] .............................................. G06F 15/16
(52) U.S. Cl. ......................................... 709/230; 714/52
(58) Field of Search ................................ 709/220, 227, 709/230, 223; 714/52, 722, 822

(56) References Cited

U.S. PATENT DOCUMENTS

| | | | | |
|---|---|---|---|---|
| 5,182,752 A | * | 1/1993 | DeRoo et al. | 714/758 |
| 6,681,364 B1 | * | 1/2004 | Calvignac et al. | 714/776 |
| 6,738,940 B1 | * | 5/2004 | Hummel et al. | 714/740 |
| 6,804,663 B1 | * | 10/2004 | Delo | 707/3 |

\* cited by examiner

*Primary Examiner*—David Y. Eng
(74) *Attorney, Agent, or Firm*—Penelope S. Wilson; John M. Gunther (57) ABSTRACT

A data transfer arrangement transfers data from a source device, such as a local mass storage facility, to a destination device, such as a remote storage facility. The data transfer arrangement comprises a source device and a destination device. The source device transfers to the destination device a data block including data and padding along with a source check value that is a function of the data and selectively the padding, and a check indication indicating whether the check value is the function of the data alone, or the data and the padding. The destination device, after receiving the data block, source check value and check indication, generates a destination check value that is the function of the data alone, or the data and the padding, based on the check indication, and uses the source and destination check values to determine whether the data block was correctly received.

33 Claims, 8 Drawing Sheets

SYSTEM AND METHOD FOR EXPEDITING TRANSFER OF DATA FROM A LOCAL STORAGE FACILITY TO A REMOTE STORAGE FACILITY

FIELD OF THE INVENTION

The invention relates generally to the field of digital data processing systems and more specifically to mass information storage arrangements for use in digital data processing systems. The invention specifically provides an arrangement, for use in connection with a mass storage subsystem including a local mass storage facility and a second, possibly remote, storage facility, that mirrors the local facility, for expediting the transfer of data from the local storage facility to the remote storage facility.

BACKGROUND OF THE INVENTION

Digital computers process data in accordance with program instructions. Generally, a computer will retrieve data to be processed from a mass storage subsystem, perform various processing operations in connection therewith to generate processed data, and store the processed data on the mass storage subsystem. The mass storage subsystem may be connected to a plurality of computers to facilitate central storage of the data, and possibly to allow sharing of data thereamong.

Computers are often used in a number of applications in which virtually continuous availability of data is important to the operation of businesses or other entities in which the computers are used. A number of strategies can be used to enhance the likelihood that data is virtually continuously available. A mass storage subsystem can be, for example, mirrored, in which the data contained in a mass storage subsystem is duplicated on another mass storage subsystem either located local to the one mass storage subsystem. This can protect against a failure or other malfunction of the one mass storage subsystem. Alternatively or in addition, another mass storage subsystem can be located remotely from the one mass storage subsystem, which can protect against a catastrophic failure or occurrence that may occur at the location of the first mass storage subsystem. In either case, when the one mass storage subsystem receives a request from a computer to store data thereon, it will generally also transfer the data to the other mass storage subsystem to facilitate storage of the data thereon.

SUMMARY OF THE INVENTION

The invention provides a new and improved system and method, for use in connection with a local mass storage facility and a second, possibly remote, storage facility, that mirrors the local facility, for expediting the transfer of data from the local storage facility to the remote storage facility.

In brief summary, the invention, in one aspect, provides a data transfer arrangement for transferring data from a source device, such as a local mass storage facility, to a destination device, such as a remote storage facility. The data transfer arrangement comprises a source interface module associated with the source device and a destination interface module associated with the destination device. The source interface module is configured to (i) receive a data block, the data block including a data portion containing the data to be transferred, and a padding portion containing padding, and (ii) transfer the data block to the destination device along with (a) a check portion including a source check value, the source check value being a selected function of the data contained in the data portion and selectively the padding contained in the padding portion and (b) a check indication indicating whether the check value is the selected function of
(I) the data contained in the data portion alone, or
(II) the data contained in the data portion and the padding contained in the padding portion; and The destination interface module is configured to (i) receive the data block and the check indication from the source interface module;

(ii) generate a destination check value that is the selected function of
(a) the data contained in the portion alone, or
(b) the data contained in the data portion and the padding contained in the padding portion,
in conformity with the check indication, and (iii) using the source and destination check values, determine whether the data block was correctly received.

In another aspect, the invention provides a source interface for use in connection with a data transfer arrangement for transferring data from a source device to a destination device, the source interface module being associated with the source device. The source interface module comprises a data block receiver module and a data block transfer module. The data block receiver module is configured to receive a data block, the data block including a data portion containing the data to be transferred, and a padding portion containing padding. The data block transfer module is configured to transfer the data block to the destination along with (i) a check portion including a source check value, the source check value being a selected function of the data contained in the data portion and selectively the padding contained in the padding portion and (ii) a check indication indicating whether the check value is the selected function of
(a) the data contained in the data portion alone, or
(b) the data contained in the data portion and the padding contained in the padding portion.

In yet another aspect, the invention provides a destination interface for use in connection with a data transfer arrangement for transferring data from a source device to a destination device, the destination interface being associated with the destination device. The destination interface comprises a data block receiver module, a destination check value generator module and a data block verification module. The data block receiver module is configured to receive (i) a data block including
(a) a data portion containing the data to be transferred,
(b) a padding portion containing padding and
(c) a check portion including a source check value, the source check value being a selected function of the data contained in the data portion and selectively the padding contained in the padding portion and (ii) a check indication indicating whether the check value is the selected function of
(a) the data contained in the data portion alone, or
(b) the data contained in the data portion and the padding contained in the padding portion.

The destination check value generator module is configured to generate a destination check value that is the selected function of (i) the data contained in the portion alone, or (ii) the data contained in the data portion and the padding contained in the padding portion, in conformity with the check indication. The data block verification module is configured to use the source and destination check values to determine whether the data block was correctly received.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
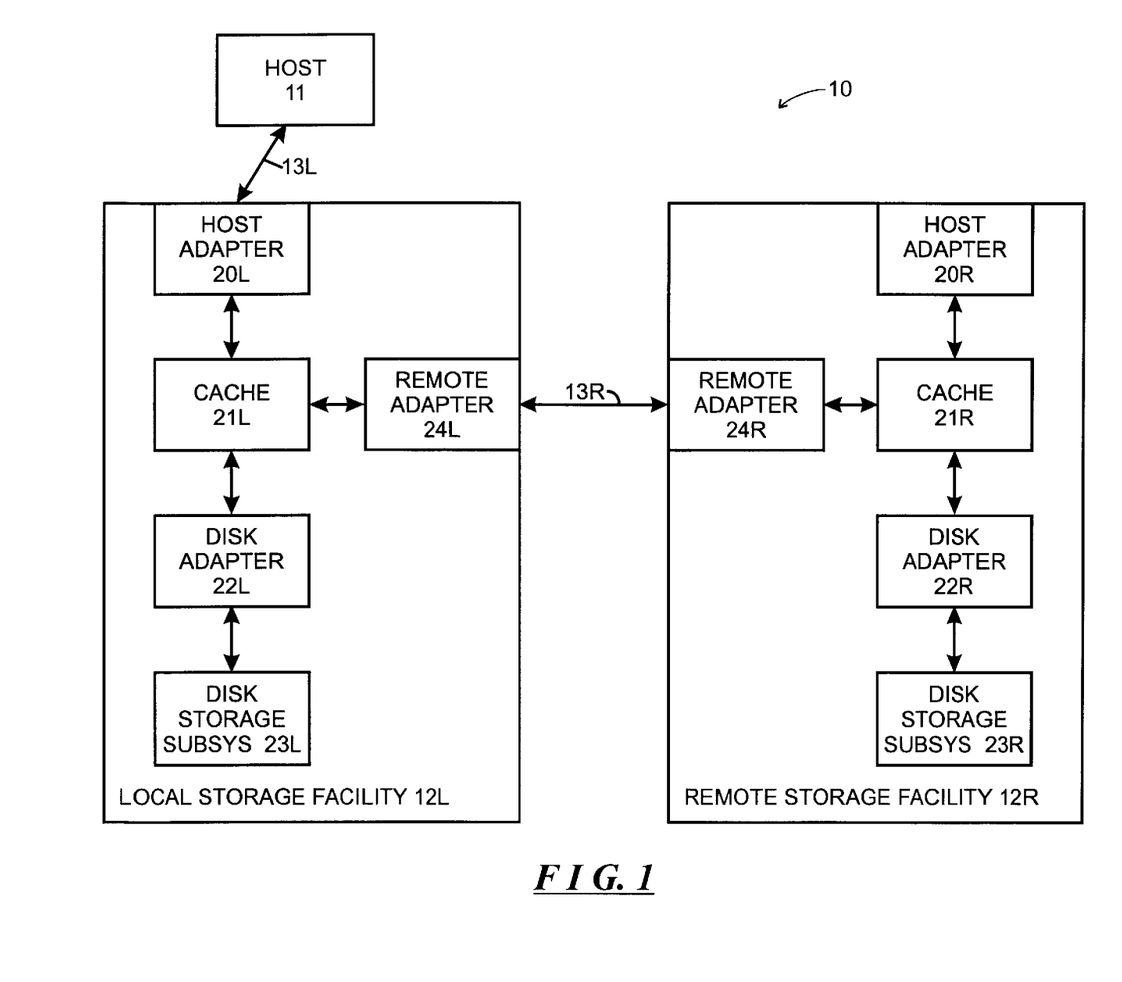
FIG. 1 is a functional block diagram of a system constructed in accordance with the invention.

FIG. 1 is a functional block diagram of a system 10 constructed in accordance with the invention. With reference to FIG. 1, system 10 includes at least one host 11, a local storage facility 12L and a second storage facility, which will be referred to as remote storage facility 12R. The host 11 used in system 10 may be any kind of device that can generate, retrieve, or otherwise make use of digital information, including, for example, personal computers, workstations, mini- and mainframe computers. As will be described below, the storage facilities 12L and 12R store information, in the form of digital data, that can be retrieved during a retrieval operation and processed by the host 11. In addition, during a storage operation, the storage facilities 12L and 12R receive digital data from the host 11 for storage therein, as will also be described below. The local storage facility 12L is preferably located relatively local to the host 11, and is connected to the host 11 over a connection that will be referred to as local communication link 13L. The local communication link 13L facilitates retrieval of data by the host 11 from the local storage facility 12L and provision of data thereby to the local storage facility 12L for storage therein. The local communication link 13L may be in the form of, for example, a direct connection, a local area network, or any other type of link over which digital data can be transferred.

The remote storage facility 12R, in turn, is preferably located remote from the host 11 and local storage facility 12L. The remote storage facility 12R is connected to the local storage facility 12L over a remote communication link 13R. As with the local communication link 13L, the remote communication link 13R may be any type of link over which digital data can be transferred, and may include, for example, a wide area network ("WAN"), the public switched telephony network (PSTN), or any other form of communication link.

The remote storage facility 12R provides "mirrored" back-up protection for some or all of the data stored in the local storage facility 12L to protect against numerous types of failures, including, for example, a catastrophic failure at the sites of the local storage facility 12L. Such a catastrophic failure may result from numerous types of events at the site of the local storage facility 12L, including, for example, fire, flood or other natural disasters, intentional tampering or sabotage, and the like, which may result in unintentional or intentional damage to the local storage facility 12L, and/or its site and consequent loss of availability of the data stored in the local storage facility 12L. The remote data protection facility 12R will preferably be located geographically remote from the sites of the local storage facility 12L sufficiently far to ensure that, if a catastrophic failure occurs at the digital data processing system, the remote storage facility 12R will survive. It will be appreciated that remote storage facilities may be provided at a number of sites that are distributed geographically, and the local storage facility 12L may be connected to remote storage facilities 12L at one or more of the sites. In addition, the remote storage facility 12R will also protect against digital data processing system failures which are less than catastrophic, such as, for example, failure of some or all of the elements of the local storage facility 12L as described below, for reasons that are not limited to catastrophic causes.

As noted above, during a retrieval operation, the host 11 retrieves data from the local storage facility 12L and, during a storage operation, the host 11 provides data to the local storage facility 12L for storage therein. During a retrieval operation, generally the host 11 will provide a retrieval request to the local storage facility 12L identifying the data to be retrieved. After receiving the retrieval request, the local storage facility 12L can obtain the identified data from local storage devices, as will be described below, and provide the data to the host 11. Generally, the data provided by the local storage facility 12L will be data retrieved from its local storage devices, not from the remote storage facility 12R, although, if a malfunction has occurred in connection with the local storage facility 12L such that the data is not available from the local storage devices, the local storage facility 12L can attempt to retrieve the data from the remote storage facility 12R for provision to the host.

During a storage operation, the host 11 provides a storage request, including the data to be stored, to the local storage facility 12L for storage therein. During a storage operation, the local storage facility 12L, after it receives the storage request from the host 11 for storage therein, will also forward the storage request to the remote storage facility 12R to facilitate storage of the data therein. Prior to forwarding the data to the remote storage facility 12R, however, the local storage facility 12L will verify that it correctly received the data from the host 11. If the local storage facility 12L verifies that it correctly received the data it will store the data in its local storage devices. On the other hand, if the local storage facility 12L determines that it did not correctly receive the data to be stored, it can so notify the host 11. If the host 11 receives a notification from the local storage facility 12L that the local storage facility 12L did not correctly receive the data to be stored, it can, for example, perform selected error recovery operations, which may include retransmitting the storage request, including the data to be stored, to the local storage facility 12L.

After the remote storage facility 12R receives the storage request from the local storage facility 12L, it will also verify that it correctly received the data from the local storage facility 12L and, after doing so, will store the data in its storage devices. In addition, after the remote storage facility 12R and has verified that the data was properly received, it will so notify the local storage facility 12L. After the local storage facility 12L has verified the data that it received from the host 11, and after it receives the notification from the remote storage facility 12R that that facility 12R has verified the data received from the local storage facility 12L, the local storage facility 12L will provide a notification to the host 11. After the host 11 receives the notification from the local storage facility 12L, can then consider the storage operation complete. It will be appreciated that, if the remote storage facility 12R determines that it did not correctly receive the data from the local storage facility 12L, it can provide an appropriate notification to the local storage facility 12L. If the local storage facility 12L receives a notification from the remote storage facility 12R that the remote storage facility 12R did not correctly receive the data, the local storage facility 12L can perform selected error recovery operations, which may include retransmitting the storage request, including the data to be stored, to the remote storage facility 12R.

The invention provides an arrangement that facilitates a reduction in the time required for the remote storage facility 12R to verify that it has correctly received data accompanying a storage request from the local storage facility 12L. As noted above, since the remote storage facility 12R does not notify the local storage facility 12L that it has correctly received the data until after it has verified the data, and since the local storage facility 12L does not provide a notification to the host 11 until after it has received the notification from the remote storage facility 12R, the invention can reduce the time period between the time the local storage facility 12L receives the storage request from the host 11 and the time the local storage facility 12L provides a notification to the host 11.

Before proceeding further, it would be helpful to describe the local and remote storage facilities 12L and 12R in more detail. The local and remote storage facilities 12L and 12R are generally similar, and so only local storage facility 12L will be described in detail. The local storage facility 12L includes a respective host adapter 20L, cache 21L, disk adapter 22L, disk storage subsystem 23L, and remote adapter 24L. The disk storage subsystem 23L includes one or more disk storage units in which data can be stored and from which previously-stored data can be retrieved. The disk storage unit(s) comprising the disk storage subsystem 23L can be any conventional disk storage device for storing digital data. As is conventional, each disk storage device includes a plurality of magnetic disks on which data, in the form of records, is stored in a plurality of tracks. Each track on a disk is aligned with a corresponding track on the other disks to form a cylinder. Each cylinder is identified by a cylinder identifier and each track is identified by a track identifier. Each track can store one or more records.

The host adapter 20L connects to the local communication link 13L and receives retrieval and storage requests from the host 11 thereover, the storage requests being accompanied by the data to be stored. During a retrieval operation, in response to a retrieval request, the host adapter 20L can transmit the data to be retrieved to the host 11 over the local communication link 13L. The retrieval request will identify the data to be retrieved by, for example, the cylinder and recording head identifiers defining the track from which data is to be retrieved. If only a portion of data from a track is to be retrieved, the retrieval request may also identify the portion to be retrieved. If data from a portion of a track is to be retrieved, the portion may be identified by, for example, an offset from the beginning of the track at which the portion begins, and a length value identifying the amount of data to be retrieved. In response to the retrieval request, the host adapter 20L can obtain the data identified in the retrieval request and provide the data to the host 11 over the local communication link 13L. It will be appreciated that, if an error occurs in connection with processing by the local storage facility 12L of a retrieval request, the host adapter 20L can also provide a notification thereof to the host 11 over the local communication link 13L, and the host 11 can initiate selected error recovery operations.

During a storage operation, the host 11 will provide a storage request to the host adapter 20L over the local communication link 13L, along with data to be stored. The storage request will identify the location in which the data accompanying the storage request is to be stored, by, for example, disk storage device, cylinder, recording head and the first record on the track defined by the cylinder and recording head at which the data is to be stored. The host adapter 20L will perform a verification operation, as will be described below, to verify that the data has been correctly received. If the data has been correctly received, the host adapter 20L will store the data in the cache 21L, from which, as will be described below, the data can be transferred to the disk storage subsystem 23L for storage. If the host adapter 20L determines that the data was not correctly received, it can transmit a notification thereof to the host 11 over the local communication link 13L notifying it that an error had occurred. It will be appreciated that, if the host adapter 20L notifies the host 11 that an error occurred, the host 11 can retransmit, and the host adapter 20L receive, the storage request and accompanying data over the local communication link 13. As noted above, and as will be described below in greater detail, the local storage facility 12L also transfers the data to the remote storage facility 12R, and, if the remote storage facility 12R also correctly receives the data, the local storage facility 12L can also provide a notification thereof to the host 11. The host adapter 20L can transmit such a notification to the host 11 over the local communication link 13L.

The cache 21L caches data received by the host adapter 20L during a storage operation before it can be stored in the disk storage subsystem 23L. Generally, the host adapter 20L, after it has received a storage request provided by the host 11 over local communication link 13L and has verified that the associated data was correctly received, will store the data in the cache 21L. As will be described below, after the data has been cached, the disk adapter 22L can retrieve the cached data for storage in the disk storage subsystem 23L. In addition, after the data has been cached, the remote adapter 24L can retrieve the cached data for transfer to the remote storage facility 12R.

The cache 20L is also used to cache data retrieved from the disk storage subsystem 23L during a retrieval operation, which data can be retrieved by the host adapter 20L and transferred to the host 11. When the host adapter 20L has received a retrieval request, if the data to be retrieved is then in the cache 21L, the host adapter 20L can retrieve the data from the cache 21L for transfer to the host 11. This may occur if, for example, the data to be retrieved had previously been stored in the cache 21L as part of a storage operation, if the data had been pre-fetched from the disk storage subsystem 23L, or for other reasons. On the other hand, if the host adapter 20L determines that the data to be retrieved is not in the cache 21L, the host adapter 20L can, as will be described below, enable the data to be retrieved from the disk storage subsystem 23L and stored in the cache 21L. After the data has been stored in the cache 21L, the host adapter 20L can retrieve the data for transfer to the host 11.

Figure 2A:
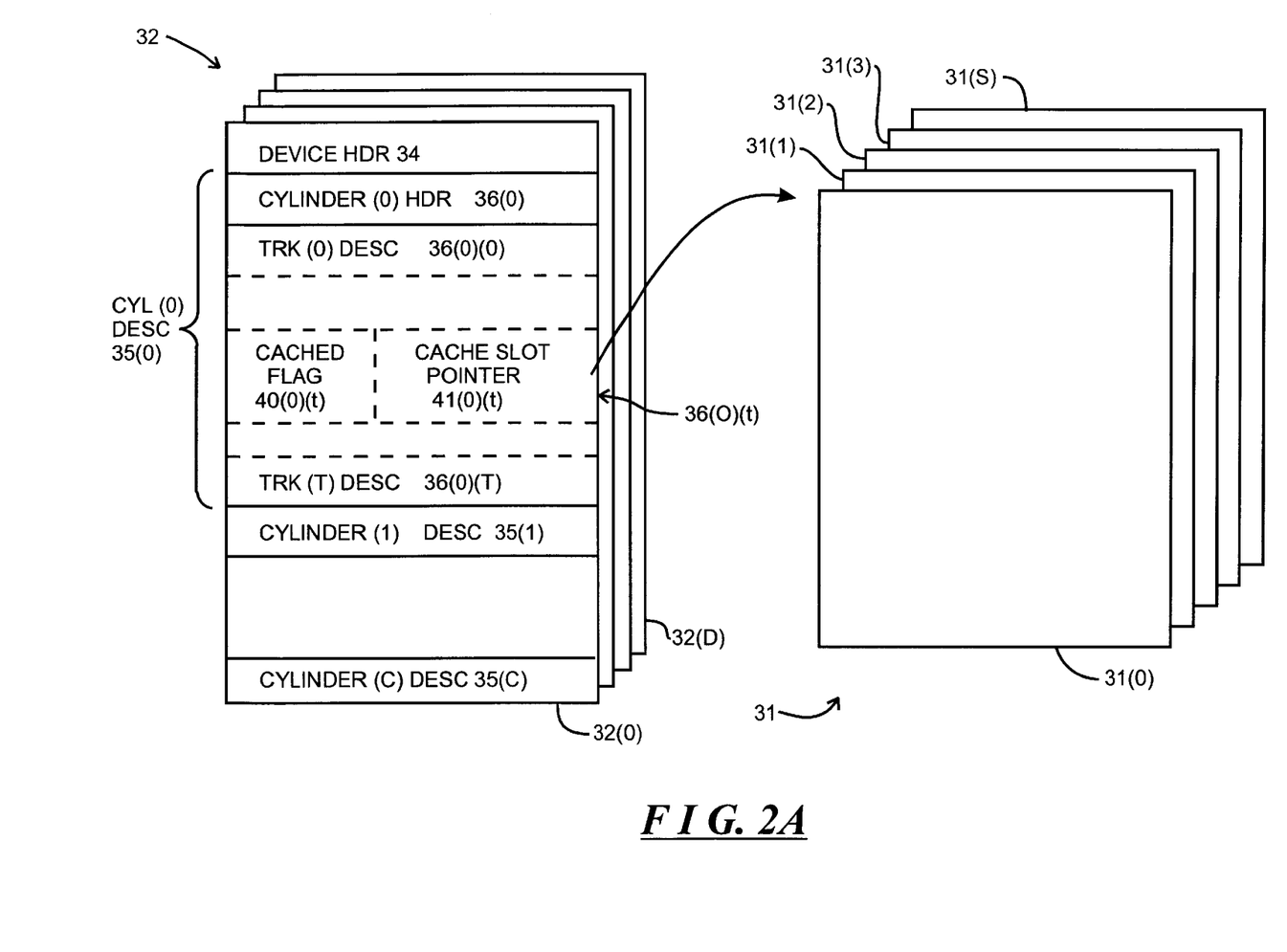
FIGS. 2A and 2B depict data structures that are useful in understanding the operation of the system depicted in FIG. 1.
Figure 2B:
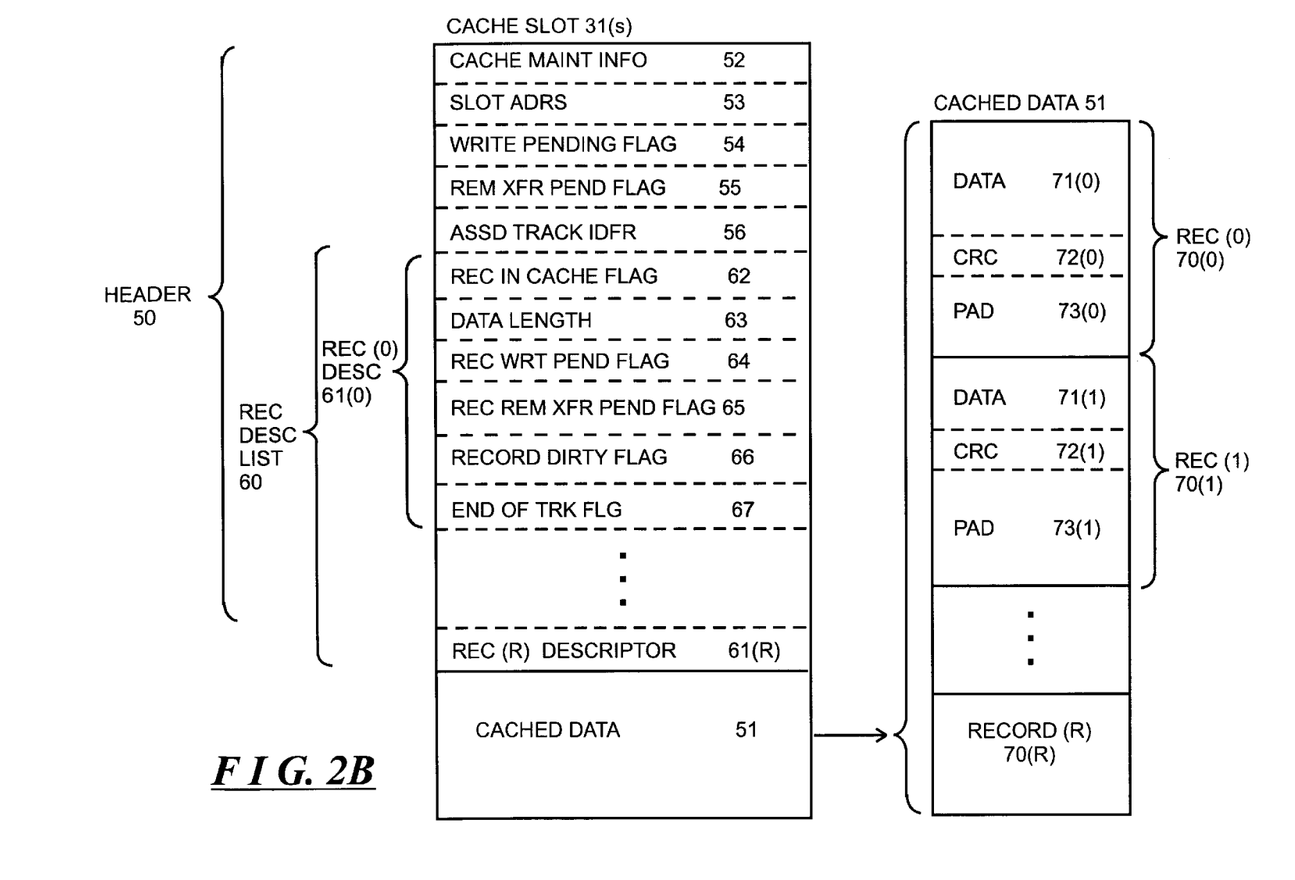

The manner in which data is organized in the cache 21L will be described below in connection with FIG. 2. Generally, data stored in the cache will be stored in cache slots, each of which will be associated with a track. The cache 21L will generally have a number of cache slots that are capable of concurrently storing data from a subset of the tracks in the disk storage units. In addition, the cache 21L stores information relating to the status of the respective tracks in the disk storage units, including whether, for a track, a cache slot is associated therewith and either contains data retrieved therefrom or to be stored therein.

The disk adapter 22L controls transfers of data between the cache 21L and the disk storage subsystem 23L. During a storage operation, after the host adapter 20L has stored the data accompanying the storage request in the cache 22L, the disk adapter 22L can retrieve the data from the cache 21L and transfer the data to the disk storage subsystem 23L for storage. On the other hand, during a retrieval operation, if the data to be retrieved is not in the cache 22L, the disk adapter 22L can retrieve the data from the disk storage subsystem 23L and store it in the cache 21L. As noted above, during a retrieval operation, after the data has been stored in the cache 21L, the host adapter 20L can retrieve the data from the cache 21L for transfer to the host 11 over the local communication link 13L.

The host adapter 20L and disk adapter 22L can communicate through, for example, work lists (not separately shown) that themselves may be stored in the cache 21L. The host adapter 20L can, for example, make use of a work list to notify the disk adapter 22L that it has stored data received from the host 11 in the cache 21L, which data is to be transferred to the disk storage subsystem 23L for storage. Similarly, the host adapter 20L can make use of a work list to notify the disk adapter 22L that data is to be retrieved from the disk storage subsystem 23L and stored in the cache 21L for use in connection with a retrieval request. Since it is generally desirable for the local storage facility 12L to complete retrieval operations as quickly as possible, the host adapter 20L will preferably make use of separate work lists for storage and retrieval notifications so that the disk adapter 22L can emphasize processing of retrieval notifications. Work lists can also be provided that can be used by the disk adapter to notify the host adapter of the status of the storage and retrieval operations performed thereby.

As noted above, the local storage facility 12L and remote storage facility 12R are generally similar. As with the local storage facility 12L, the remote storage facility 12R includes a cache 21R, disk adapter 22R, disk storage subsystem 23R and remote adapter 24R. If the remote storage facility 12R is also to perform storage and retrieval operations in connection with requests from a host local thereto, the remote storage facility 12R can also be provided with a host adapter 20R, as shown in FIG. 1. On the other hand, if the remote storage facility 12R is not to perform storage and retrieval operations in connection with requests from a host local thereto, the remote storage facility 12R need not be provided with a host adapter 20R.

The remote adapters 24L and 24R control transfers of data from the local storage facility 12L to the remote storage facility 12R for storage in the remote storage facility 12R. As with the host 11 providing a storage request to the local storage facility 12L to initiate a storage operation during which data is stored therein, the local storage facility 12L, and, in particular, the remote adapter 24L provides a remote storage request to the remote storage facility 12R to initiate a storage operation during which data is stored in the remote storage facility 12R. The remote adapter 24 receives the remote storage requests and can process them in a manner similar to that performed by host adapter 20L described above. That is, the remote adapter 24R, after it receives a remote storage request and associated data, performs a verification operation to verify that the data was correctly received. If the remote adapter 24R determines that the data was correctly received, it can store the data in the cache 21R and provide an appropriate notification to the local storage facility's remote adapter 24L. The local storage facility's remote adapter 24L, in turn, can forward the notification to the host adapter 20L, which, in turn, can provide the notification to the host 11 that the storage operation had been completed. It will be appreciated that, if the remote adapter 24R during the verification operation determines that the data was not correctly received, it can so notify the remote adapter 24L, which can perform selected recovery operations, which may include retransmitting the data.

As noted above, each cache 21L, 21R operates to cache data for access by the host adapter 20L, 20R, disk adapter 22L, 22R and remote adapter 24L, 24R. The structure of the caches 21L, 21R will be described in connection with FIGS. 2A and 2B. With reference to FIG. 2A, each cache 23L, 23R comprises a cache memory 31 and a cache index directory 32. The cache memory 31 operates as the actual cache buffer in connection with storage and retrieval operations, in particular caching data provided by the host adapter 20L or remote adapter 24R during a storage operation and data received from the disk storage subsystem 23L which may be retrieved by the host adapter 20L during a retrieval operation.

The cache memory 31 and cache index directory 32 will generally be described in connection with FIGS. 2A and 2B. With reference to FIG. 2A, the cache memory 31 includes a plurality of storage locations, which are organized in a series of cache slots 31(0) through 31(S) (generally identified by reference numeral 31($s$)). The storage locations are, in turn, identified by a series of addresses, with the starting address of each cache slot being identified by a base address. The cache slots 31($s$) provide the cache buffering for the cache 23L, 23R as described above. The cache index directory 32 operates as an index for the cache slots 31($s$) in the cache memory 31.

The cache index directory 32 includes a plurality of cache index tables 32(0) through 32(D) (generally identified by reference numeral 32($d$)), each of which is associated with one of the disk storage devices comprising the disk storage subsystem 23L. Each cache index table 32($d$) includes a device header field 34, which provides, for example, selected identification and status information for the disk storage device associated with the cache index table 32($d$). In addition, each cache index table 32($d$) includes a plurality of cylinder descriptors 35(1) through 35(C) (generally identified by reference numeral 35($c$)) each of which is associated with one of the cylinders in the dis storage device that is associated with the cache index table 32($d$). Each cylinder descriptor 35($c$), in turn, includes a cylinder header 36($c$), which provides, for example, selected identification and status information for the cylinder associated with the cylinder descriptor 35($c$).

In addition, each cylinder descriptor 35($c$) includes a plurality of track descriptors 35($c$)(0) through 35($c$)(T) (generally identified by reference numeral 35($c$)($t$)), each of which is associated with one of the tracks in the cylinder 35($c$). Each track descriptor 35($c$)($t$), in turn, includes information for the associated track of the storage device 22, including whether the track is associated with a cache slot 31($s$) in the cache memory 31, and, if so, the identification of the cache slot 31($s$) with which the track is associated. In one embodiment, each track descriptor 35($c$)($t$) includes a cached flag 40($c$)($t$), a cache slot pointer 41($c$)($t$), and may also include other status and control information (not separately shown). The cached flag 40($c$)($t$), if set, indicates that the track associated with the track descriptor 35($c$)($t$) is, in turn, associated with a cache slot. If the cached flag 40($c$)($t$)

is set, the cache slot pointer 41(c)(t) points to one of the cache slots 31(s), thereby associating the track with the respective cache slot 31(s). If the cached flag 40(c)(t) is set, information from the track can be cached in the cache slot 31(s) identified by the cache slot pointer 41(c)(t) for retrieval by a host adapter 24(n) and updated information can be stored by a host adapter 24(n) in the cache slot 31(n) for later storage on the associated track storage.

The structure of a cache slot 31(s) will be described in connection with FIG. 2B. With reference to FIG. 2B, cache slot 31(s) includes a header portion 50 and a cached data portion 51. Generally, the cached information portion 51 contains the data that is cached in the cache slot 31(s) for the track that is associated with the cache slot 31(s). The header portion 50 generally contains information concerning the cache slot 31(s), including information used to maintain the ordering of the cache slots in connection with the particular cache slot replacement algorithm selected for the cache memory 31, the identification of the track associated with the cache slot, information as to whether the cache slot contains updated information from a host adapter 24(n) which needs to be stored on the track associated with the cache slot 31(s), and information as to the individual records that are stored in the cache slot 31(s).

More specifically, the cache slot's header portion 50 includes a cache maintenance information field 52, a slot address field 53, a write pending field 54, a remote transfer pending flag 55 and an associated track identifier field 56. The cache maintenance information field 52 contains information used in connection with the particular cache slot replacement algorithm which is selected for the cache memory 31. For example, if a least-recently-used cache slot replacement algorithm is used for the cache memory 31, the cache maintenance information field 52 can be used to link the cache slots 31(s) in the cache memory 31 in a doubly-linked list of cache slots, effectively linking the cache slots in an order corresponding to that in which they were most recently accessed by the host adapter 20L, the disk adapter 22L or the remote adapter 24L. The slot address field 53 identifies the address of the cache slot 31(s) in the cache memory 31.

The write pending flag 54, if set, indicates that the cache slot contains data that will need to be transferred to the disk storage subsystem 23L, 23R for storage on the associated track. If the write pending flag 54 is not set, the cache slot does not contain data that will need to be transferred to the disk storage subsystem 23L, 23R for storage on the associated track. Similarly, the remote transfer pending flag 55, if set, indicates that the cache slot contains data that will need to be transferred to the remote storage facility 12R. If the remote transfer pending flag 55 is not set, the cache slot 31(s) does not contain data that will need to be transferred to the remote storage facility 12R. Generally, the write pending flag 54 will be set by the host adapter 20L or remote adapter 24R when it stores data in the cache slot that is to be transferred to the respective disk storage subsystem 23L, 23R for storage, and will be cleared by the disk adapter 22L, 22R after it has transferred the data to the disk storage subsystem 23L, 23R for storage. Similarly, the remote transfer pending flag 55 will be set by the host adapter 20L when it stores data in the cache slot that is to be transferred to the remote storage facility 12R, and will be cleared by the remote adapter 24L after it has received a notification from the remote adapter 24R that the data has been correctly received thereby.

The associated track identifier field 56 identifies the track in the disk storage subsystem 23L that is associated with the cache slot 31(s), that is, the track from which the data was obtained during a retrieval operation, or in which data therefrom is to be stored during a storage operation.

The cache slot's header portion 50 also includes a record descriptor list 60 comprising one or more record descriptors 61(0) through 61(R) (generally identified by reference numeral 61(r)). Each record descriptor 61(r) is associated with one of the records that is stored on the track identified by the associated track identifier field 56. Each such record is associated with a different record descriptor 61(r), and, if a plurality of records is stored on a track, record descriptor 61(0) is associated with the first record on the track, record descriptor 61(1) is associated with the second record on the track, and so forth.

The record descriptors 61(r) are all similar. Each record descriptor 61(r) includes a plurality of flags and other information that provide information concerning the record associated therewith, including a record in cache flag 62, a data length field 63, a record write pending flag 63, a record remote transfer pending flag 66, a record dirty flag 66 and an end of track flag 67. The record in cache flag 62 is set if data from the record is stored in the cache slot 31(s). The data may be stored in the cache slot either after having been retrieved from the disk storage subsystem 23L during a retrieval operation, in which case the record in cache flag 62 may be set by the disk adapter 22L. Alternatively, the data may be stored in the cache slot after having been received by the host adapter 20L from the host 11, or by the remote adapter 24R from the local storage facility 12L, during a storage operation, in which case the flag may be set by the host adapter 20L or remote adapter 24R. It will be appreciated that, during a retrieval operation, only data from the record or records that are to be provided to the host 11 need be retrieved from the disk storage subsystem 23L and stored in the cache slot 31(s). Similarly, during a storage operation, the data received from the host 11 will only be data from records that are to be updated. In each case, the cache slot 31(s) may contain data from only a subset of the records that are stored on the track identified by the associated track identifier field 56, namely, those for which the record in cache flags 62 are set in the respective record descriptors 61(r).

The data length field 63 stores a value that identifies the amount of data comprising the record. As will be described below, the amount of data comprising the record may not fill the space on the track that has been allocated for the record, and the data length value stored in field 63 identifies the amount of data in the record. Except for a check value that is also stored in the space allocated for the record, and can be used in determining whether the data is correct, the remainder of the space allocated for the record may be filled with padding, which may be, for example, data of predetermined value.

The record write pending flag 63 and record remote transfer pending flag 66 are used for similar functions, at the record level, as the write pending flag 54 and remote transfer pending flag 55 at the track level. If, in record descriptor 61(r), the record write pending flag 63 is set, the cache slot 31(s) contains updated data for the record associated with record descriptor 61(r), which updated data is to be stored in the disk storage subsystem 23L, 23R. Similarly, if the record remote transfer pending flag 66 is set, the cache slot 31(s) contains updated data for the record associated with record descriptor 61(r), which updated data is to be transferred to the remote storage facility 12R. When the host adapter 20L or remote adapter 24R stores data in the cache slot 31(s) for a record, it will set both the record write pending flag 63 and the record remote transfer pending flag 66 in the record descriptor 61(r) associated with the record. After the disk adapter 22L, 22R has enabled updated data from a record to be stored in the disk storage subsystem 23L, 23R, it can clear the record write pending flag 63 in the record descriptor 61(r) that is associated with the record. In addition, after the disk adapter 22L, 22R has enabled updated data from all of the records stored in the cache slot 31(s) for which data has been updated to be stored in the respective disk storage subsystem 23L, 23R, the disk adapter 22L, 22R can also clear the write pending flag 54. Similarly, after the remote adapter 24L has transferred data from a record to the remote storage facility 12R, it can clear the record remote transfer pending flag 66 associated with the record. In addition, after the remote adapter 24L has transferred to the remote storage facility 12R updated data from all of the records stored in the cache slot 31(s) for which data has been updated, the remote adapter 24L can clear the remote transfer pending flag 55. As noted above, generally, the disk adapter 22L will enable data from the cache 21L to be stored in the disk storage subsystem 23L with a priority secondary to retrieving data from the disk storage subsystem 23L for transfer to the cache 21L. In addition, the disk adapter 22L may schedule transfers of data from the cache 21L to the disk storage subsystem 23L based on, for example, the position of the read/write heads, to minimize the time required seek time required to some time after the data is stored in the cache 21L. Generally, however, the remote adapter 24L will normally transfer updated data from storage requests from the host 11 to the remote storage facility 12R in the order that the storage requests are received from the host 11.

The record dirty flag 66 will be used for a purpose that will be described below.

The end of track flag 67, if set indicates that the record associated with record descriptor 61(r) is the last record on the track. The end of track flag 67, if set, will also indicate that the record descriptor 61(r) is the last record descriptor 61(R) in the record descriptor list 60, and so the cached data portion 51 will immediately follow that descriptor 61(R).

The cached data portion 51 contains the actual data that has either been retrieved from the disk storage subsystem 23L for the track, or that is to be transferred to the disk storage subsystem 23L for storage therein. The cached data portion 51 has sufficient space to store the contents of all of the records that may be stored on a track, but it will be appreciated that only records that have been retrieved from the disk storage subsystem 23L in response to, for example, a retrieval request, or that have been provided by the host 11 to accompany a storage request, may be stored in the cached data portion 51. The organization of information in the cached data portion 51 is also shown in FIG. 2B. In the following, it will be assumed that data from all of the records stored on the track associated with the cache slot 31(s) is in the cache slot 31(s). In that case, and with continued reference to FIG. 2B, the cached data portion includes space for storing one or more records 70(0) through 70(R) (generally identified by reference numeral 70(r)), the number "R" corresponding to the number of record descriptors 61(r) in the record descriptor list 60. Each record 70(r), in turn, comprises a data field 71(r) and a CRC field 72(r), and may also comprise a padding field 73(r). The data field 71(r) stores the actual data in the record, illustratively the data that either can be or has been processed by the host 11. The CRC field 72(r) stores a cyclic redundancy check ("CRC") value of the contents of the data field 71(r). As is conventional, the CRC value provides a check mechanism that facilitates determination of whether the data in the data field 71(r) has been corrupted. If the sum of the amount of data in the data field 71(r) and the size of the CRC field 72(r) is less than the space allocated for the record 70(r) in the cached data portion 51, the record 70(r) will also be provided with the padding field 73(r). The amount of data in the data field 71(r) may differ as among the various records, and the data length field 63 in the record descriptor 61(r) associated with the record 70(r) will identify the amount of data in the particular record 70(r). Generally, however, the same amount of space will be allocated for all of the records in the track, and so the sizes of the padding fields 73(r) may also differ as among the various records.

As noted above, the record descriptor 61(r) associated with a record 70(r) includes a record dirty flag 66. Generally, the system 10 provides for two specific types of storage operations, which will be referred to herein as an update write storage operation and a format write storage operation, each of which initiated by a respective type of storage request. In an update write storage operation in connection with a record 70(r), the contents of the data stored in the data field 71(r) of the record 70(r) changes but the amount of data does not change; in that case, the data length value in the data length field 63 of the record descriptor 61(r) associated with the record 70(r) does not change. On the other hand, in a format write storage operation, not only the contents of the data in the data field 71(r) can change, the amount of data can also change; in that case, the data length value in the data length field 63 of the record descriptor 61(r) associated with the record 70(r) may change.

As noted above, the CRC value in the CRC field 72(r) provides a mechanism that facilitates determination of whether the data in the data field 71(r) has been corrupted. Generally, if, in a record 70(r), the padding value or values contained in the padding field 73(r) all have the value "zero," the CRC value generated from the contents of the data field 71(r) will be the came as if the CRC value were generated using the contents of both the data field 71(r) and the padding field 73(r). On the other hand, if the padding field contains at least one padding value that has a value other than "zero," the CRC value generated from the contents of the data field 71(r) may, but need not, differ from the CRC value that may be generated from the contents of both the data field 71(r) and the padding field 73(r). If the padding value(s) in the padding field 73(r) of a record 70(r) initially all have the value zero, and if a storage operation in connection with the record 70(r) is a format write storage operation during which the size of the data field 71(r) after the format write storage operation will be smaller than the size prior to the format write storage operation, it will be appreciated that, after the format write storage operation, the padding field 73(r) may have padding values that are not zero. The portion of the padding field 73(r) after the format write storage operation that may not be zero may correspond to the CRC value in the CRC field 72(r) prior the format write storage operation and possibly one or more values from the end of the data field 71(r) prior to the format write storage operation. In that case, the CRC value that would be generated from the contents of the data field 71(r) may differ from the CRC value that would be generated from the contents of both the data field and the padding field. In that case, the host adapter 20L will set the record dirty flag 66 of the record descriptor 61(r) associated with the record 70(r).

However, if the padding value(s) in the padding field 73(r) of a record 70(r) initially all have the value zero, and if a storage operation in connection with the record 70(r) is an update write storage operation, during which, as noted above, the size of the data field 71(r) is unchanged, it will be appreciated that, after the storage operation the padding field 73(*r*) will also have padding values all of which are zero. In that case, the CRC value that would be generated from the contents of both the data field 71(*r*) and the padding field 73(*r*) would correspond to the CRC value that would be generated just for the data field 71(*r*). Similarly, if the padding value(s) in the padding field 73(*r*) of a record 70(*r*) initially all have the value zero, and if a storage operation in connection with the record 70(*r*) is a format write storage operation after which the size of the data field 71(*r*) will be larger than or equal to the size prior to the format write storage operation, it will be appreciated that, after the format write storage operation, the padding field 73(*r*) will also have padding values all of which are zero. In that case, the CRC value that would be generated from the contents of both the data field 71(*r*) and the padding field 73(*r*) would also correspond to the CRC value that would be generated just for the data field 71(*r*). In either case, the host adapter 20L can leave the record dirty flag 66 of the record descriptor 61(*r*) associated with the record 70(*r*) unchanged. It will be appreciated that the record dirty flag 66 may be set, if, as described above, there was an earlier format write storage operation in which the size of the data field 71(*r*) after the format write storage operation was smaller than the size after the format write storage operation.

In any case, the disk adapter 22L, when it retrieves data from a record 70(*r*) whose record dirty flag 66 is set, will ensure that the padding values in the padding field 73(*r*) are all zero, both in the cached data field 51 of the cache slot 31(*s*) and as stored in the disk storage subsystem 23L, and clear the record dirty flag.

As noted above, the local storage facility 12L, after it receives a storage request from the host 11, and after it determines that the data accompanying the request was correctly received, transfers the data to the remote storage facility 12R for storage therein. In that operation, the host adapter 20L will initially store the data, which may be associated with one or more records 70(*r*), in one or more cache slots 31(*s*), and notify the local storage facility 12L's remote adapter 24L that the data from the respective record(s) had been received. Thereafter, the remote adapter 24L will retrieve the contents of the records that were to be updated, and transfer the contents to the remote storage facility's remote adapter 24R for storage in the cache 22R. In that operation, the remote adapter 24L will provide, along with a storage request, a remote storage block containing the contents of all of the records 70(4) were updated in response to the respective storage request from the host 11, including, for each such record, the contents of the data, CRC and padding fields 71(*r*), 72(*r*) and 73(*r*).

In addition, the remote adapter 24L will include in the remote storage block a unitary remote storage block CRC value that covers the entire remote storage block. It will be appreciated that, if the padding fields 73(*r*) of the records whose information is included in the remote storage block all contain padding having the value "zero," the value of the remote storage block CRC will correspond to the CRC of the values contained in the CRC fields 72(*r*) of the records whose information is included in the remote storage block. Accordingly, the remote adapter 24L can generate the remote storage block CRC using only the CRC value(s) contained in the CRC field(s) 72(*r*), 72(*r'*) . . . of the record(s) 70(*r*), 70(*r'*), . . . that are to be transferred in the remote storage block. In particular, since each CRC value contained in a CRC field 72(*r*) is the CRC of the contents of the data field 71(*r*) of the respective record 70(*r*), the CRC value for the record 70(*r*) can be determined by applying the CRC value to itself using the particular CRC algorithm. In addition, the CRC value for the entire remote storage block can be determined by applying the CRC algorithm to the CRC values so generated for the respective records 70(*r*), 70(*r'*) comprising the remote storage block. Accordingly, since the padding fields 73(*r*), 73(*r'*), . . . will be ensured to have the padding value "zero" if all of their record dirty flags 66 are clear, the local storage facility's remote adapter 24L can generate the block CRC value for the remote storage block using this methodology.

On the other hand, if a padding field 73(*r"*), 73(*r"'*), . . . in a record 70(*r"*), 70(*r"'*), . . . in the remote storage block, contains a padding value that may be non-zero, which will be the case if the record dirty flag 66 in the record descriptor 61(*r"*), 61(*r"'*), . . . associated with the record is set, the local storage facility's remote adapter 24L will also make use of the padding values in the respective padding field when generating the block CRC value for the remote storage block. Accordingly, for at least each record for which the record dirty flag 66 is set, the remote adapter 24L will also make use of the contents of the padding field in generating the block CRC value for the remote storage block.

After the remote storage facility's remote adapter 24R receives from the remote adapter 24L the remote storage block and the block CRC value, it will use the contents of the records in the remote storage block as well as the block CRC value to determine whether the remote storage block was correctly received. In that operation, the remote adapter 24R will also generate a block CRC value for the remote storage block, and compare the block CRC value that it generates to the block CRC value received from the local storage facility's remote adapter 24L. For records 70(*r'*), 70(*r"'*), . . . for which the record dirty flag 66 is set, the remote adapter 24R will make use of the entire record, including the data, CRC and padding field 71(*r"*), 72(*r"*), 73(*r"*), 71(*r"'*), 72(*r"'*), 73(*r"'*), . . . in generating the block CRC value. On the other hand, for records 70(*r*), 70(*r'*), . . . for which the record dirty flag 66 is clear, the remote adapter 24R need only make use of the data fields 71(*r*), 71(*r'*), . . . and the CRC fields 72(*r*), 72(*r'*), . . . of the records in generating the block CRC value. Accordingly, the amount of time required by the remote adapter 24R to generate the block CRC value for a remote storage block can be reduced by the amount of time that would be required to process the padding values from the padding fields 73(*r*), 73(*r'*), . . . of records for which the record dirty flag 66 is clear. As a result, the amount of time after the remote storage facility's remote adapter 24R receives the remote storage block, until the remote adapter 24R notifies the local storage facility's remote adapter 24L whether it has correctly received the remote storage block, can be reduced by the amount of time that would be required to process the padding values from the padding fields 73(*r*), 73(*r'*), . . . of records for which the record dirty flag 66 is clear.

It will be appreciated that, to facilitate use by the remote storage facility's remote adapter 24R of the record dirty flag(s) 66 for the record(s) 70(*r*) in the remote storage block, the local storage facility's remote adapter 24L will need to provide the record dirty flag(s) to the remote adapter 24R in either the remote storage request or the remote storage block. In one embodiment, the remote adapter 24L will provide, instead of the individual record dirty flag(s) 66 of the record(s) 70(*r*) that are included in the remote storage block, a consolidated record dirty flag that is the logical OR of the record dirty flag(s) 66 of the record(s) 70(*r*) included in the remote storage block. In that embodiment, if the record dirty flag 66 of any record 70(*r*) in the remote storage block is set, the consolidated record dirty flag will also be set, in which case the remote storage facility's remote adapter 24R will include the padding values from the padding fields 73(r), 73(r'), 73(r''), 73(r'''), ... of all of the records 70(r), 70(r'), 70(r''), 70(r'''), ... in the remote storage block when generating the block CRC value.

In addition, as noted above, the local storage facility's host adapter 20L, when it receives a storage request for a format write storage operation, can set the record dirty flag 66 associated with a record 70(r) if the data field 71(r) after the format write storage operation is smaller than before the format write storage operation, but leave the record dirty flag 66 unchanged if the data field after the format write storage operation is the same size or larger than before the format write storage operation. In one embodiment, the local storage facility's host adapter 20L will set the record dirty flag 66 associated with a record 70(r) if the storage operation is a format write storage operation, regardless of the relative sizes of the data field 71(r) before and after the format write storage operation. This will reduce the amount of time that may be required for the host adapter 20L to process the storage request.

Figure 3:
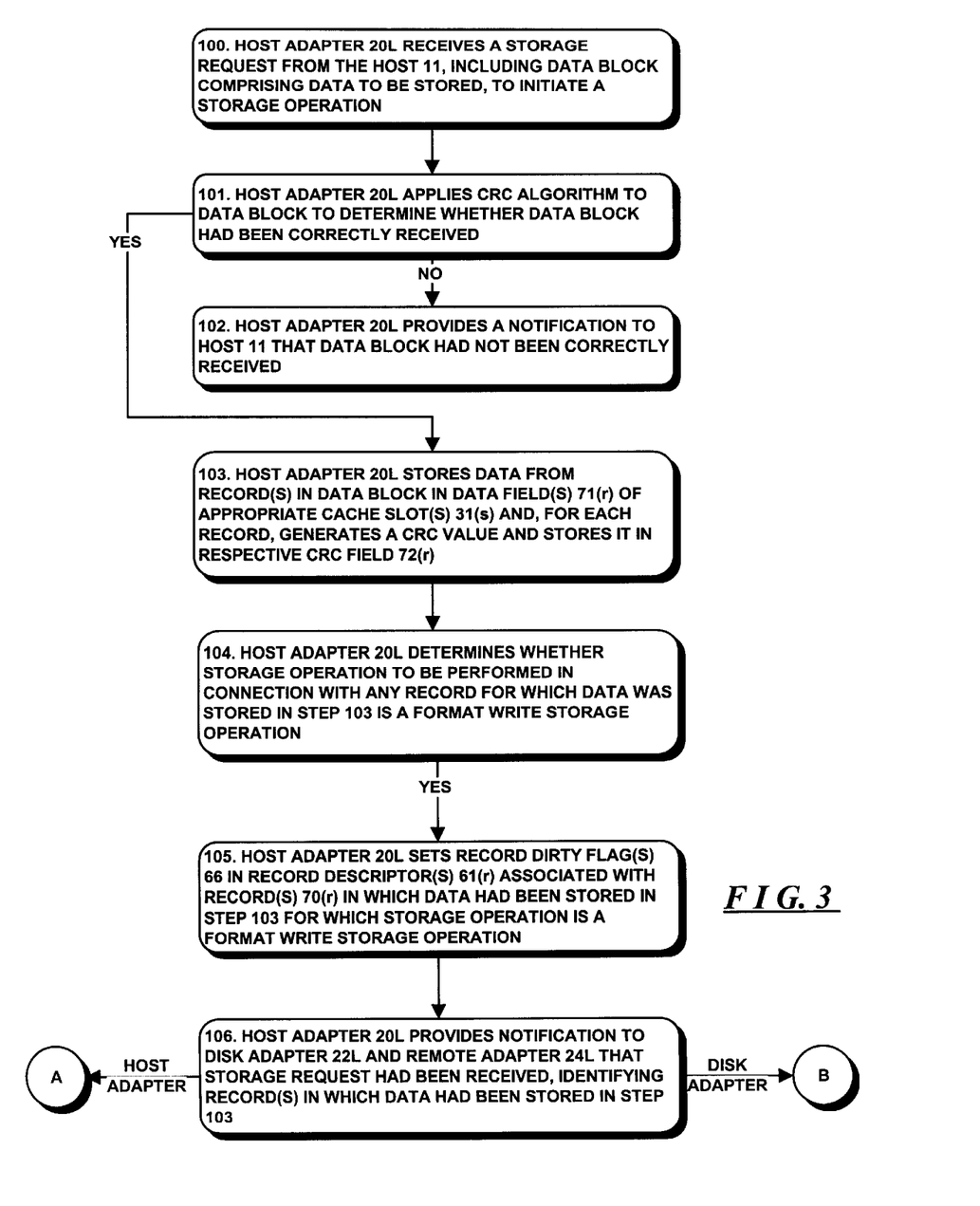
FIG. 3 depicts a flow chart detailing operations performed by the system depicted in FIG. 1.
Figure 3A:
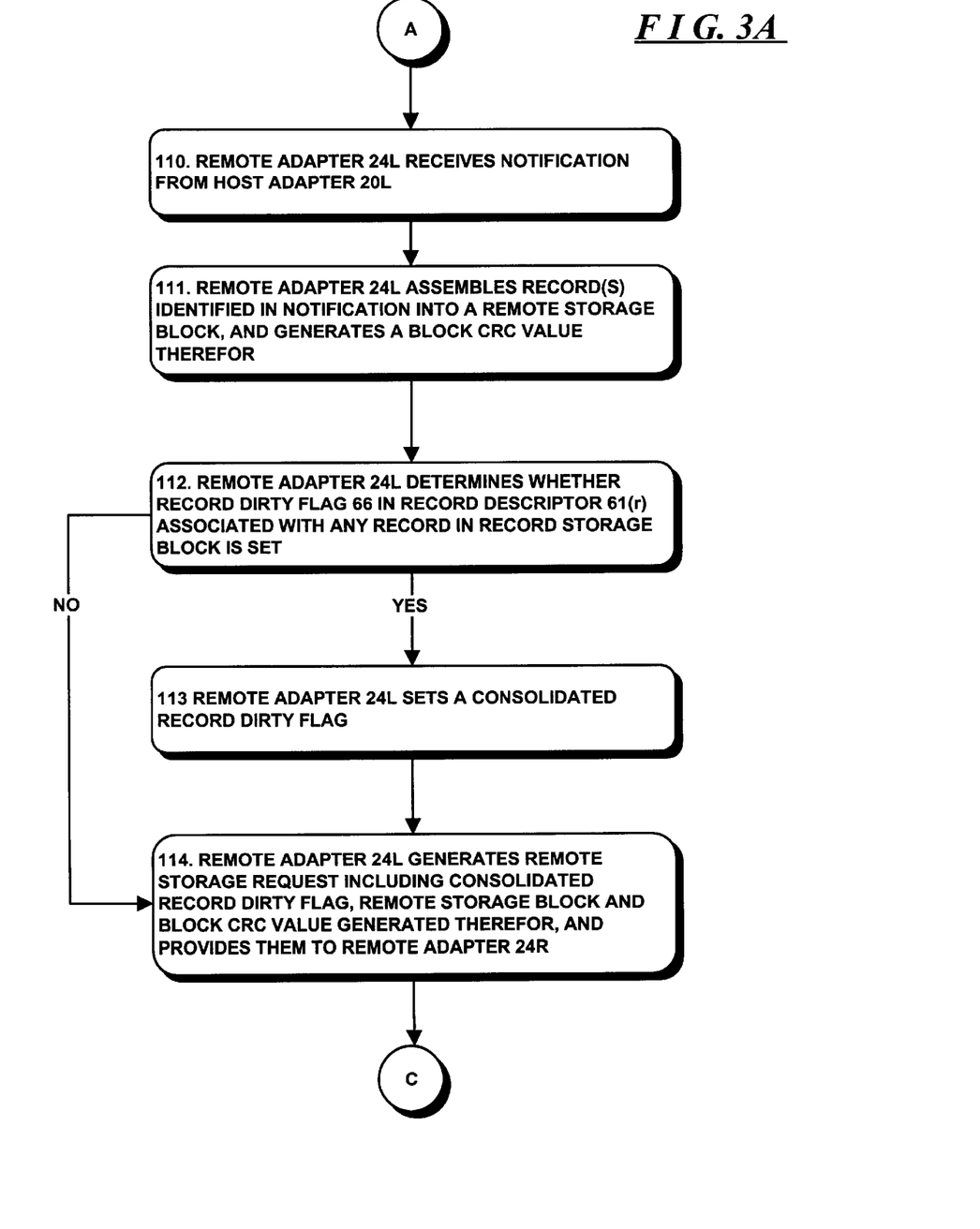
Figure 3B:
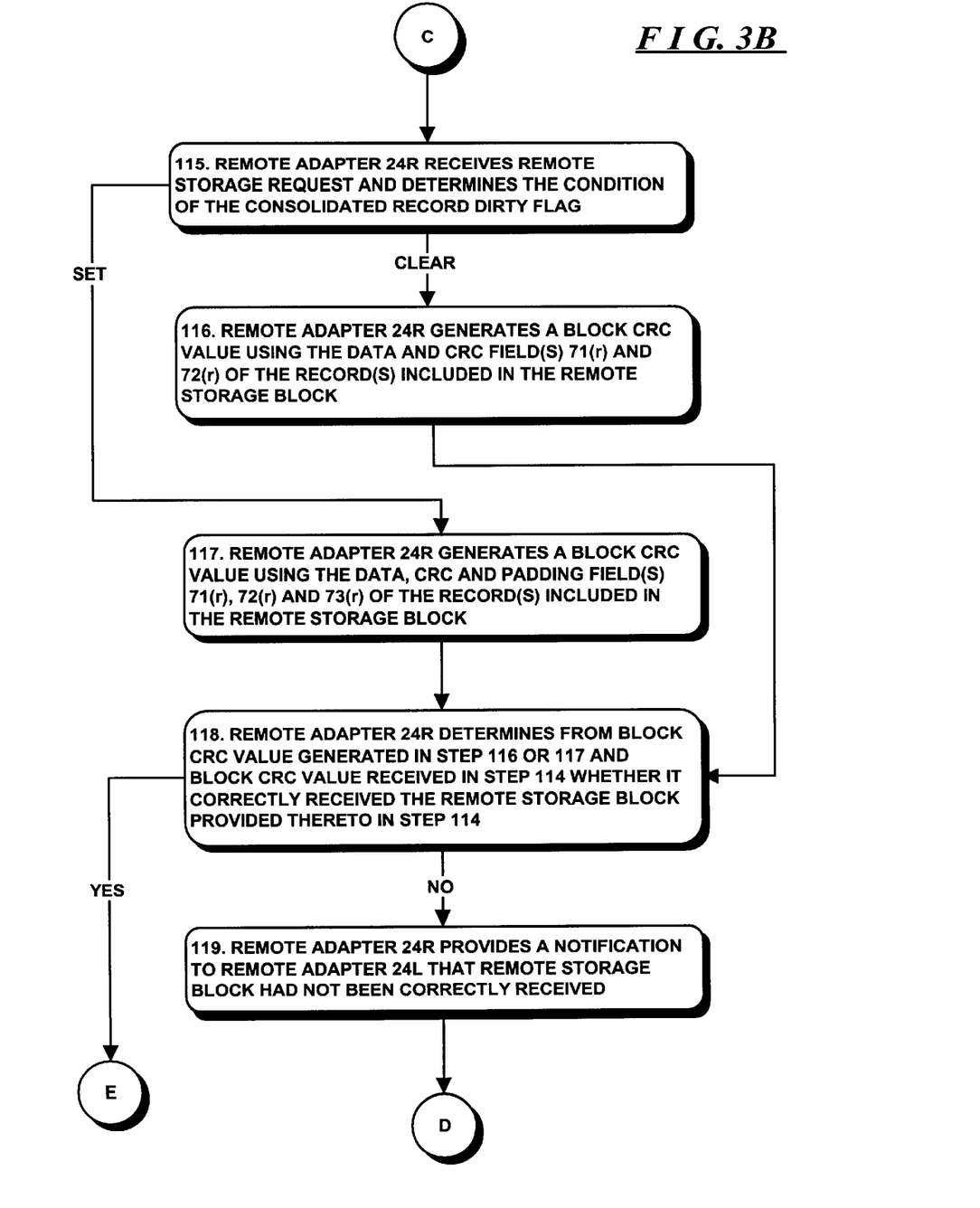
Figure 3C:
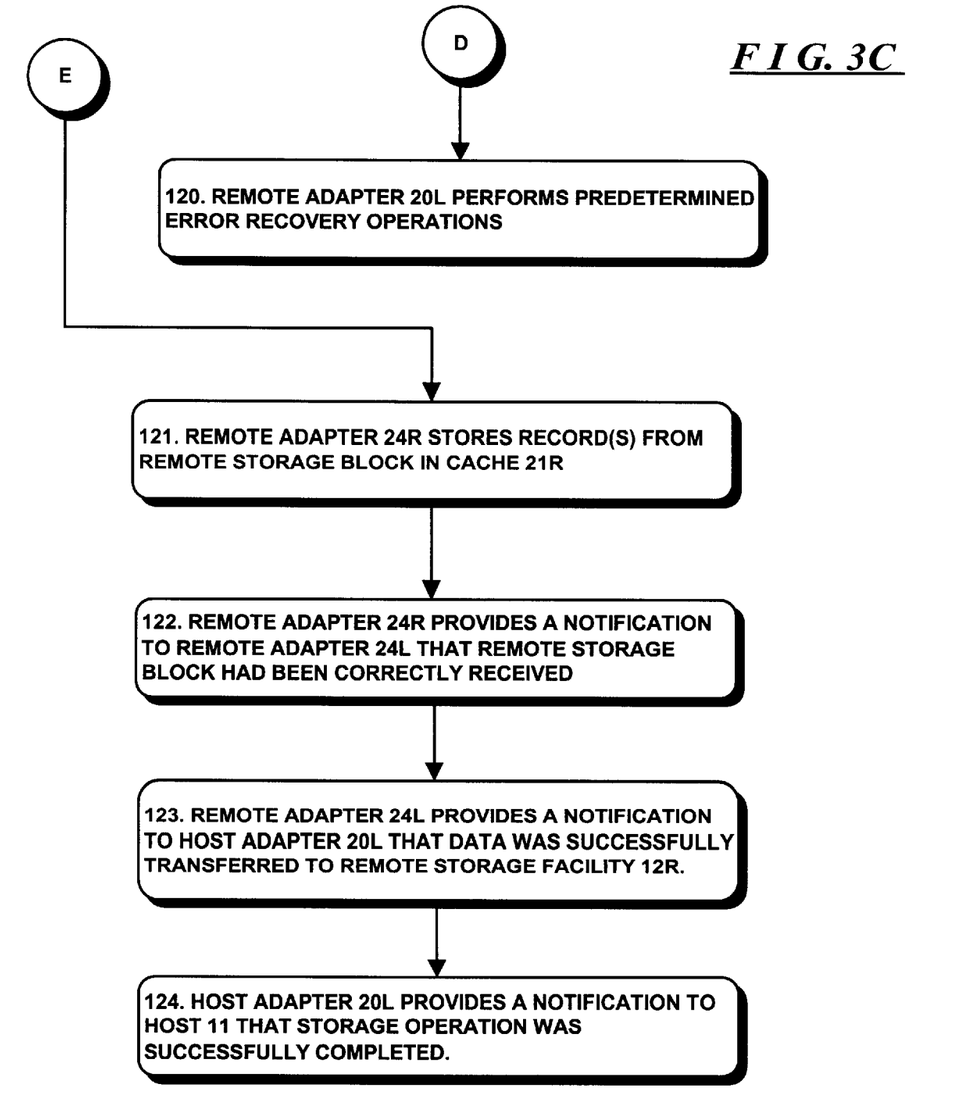
Figure 3D:
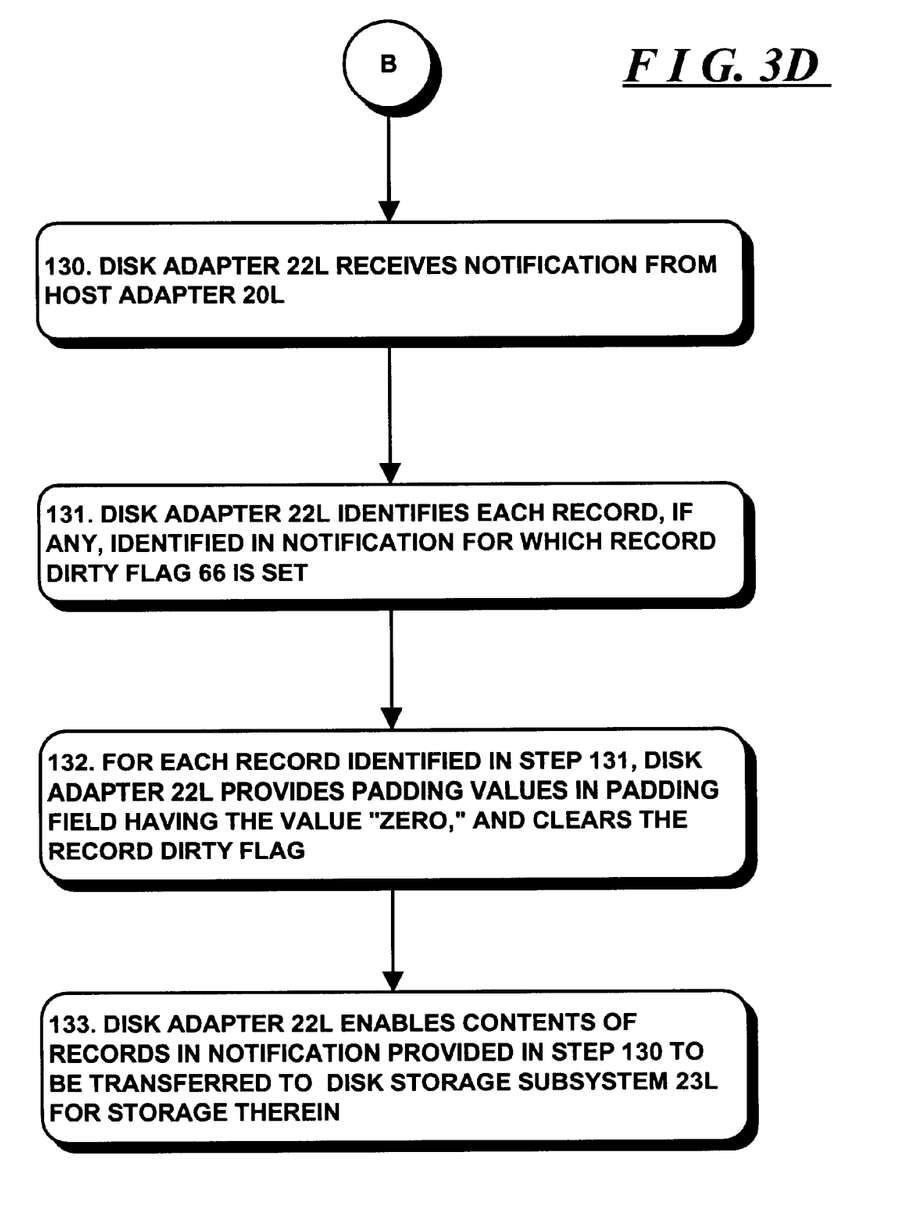

Operations performed by the local storage facility 12L and the remote storage facility 12R in connection with a storage request are depicted in detail in a flow chart in FIG. 3. The operations will be apparent from the above description, and will not be described further herein.

The invention provides a number of advantages. In particular, the invention provides an arrangement whereby the local storage facility 12L can provide a notification to the remote storage facility 12R as to whether the remote storage facility 12R can, when generating a block CRC value for a remote storage block, ignore the padding field(s) 73(r) of record(s) 70(r) provided thereto in the remote storage block, which can reduce the amount of time required by the remote storage facility 12R to generate the block CRC value and determine whether the remote storage block had been correctly received. This, in turn, can reduce the amount of time between the time that the remote storage facility 12R receives the remote storage block and the time the remote storage facility 12R notifies the local storage facility 12L that the remote storage block had been correctly received, and, in addition, the amount of time between the time that the local storage facility 12L receives the storage request from the host 11 and the local storage facility 12L notifies the host that the storage operation had been completed.

It will be appreciated that numerous changes and modifications may be made to the system 10 described above. For example, one or both of local storage facility 12L and remote storage facility 12R may be connected to, and receive storage and retrieval requests from, a plurality of hosts 11. Either or both of the local storage facility 12L and remote storage facility 12R may include a plurality of host adapters 20L, 20R that connect to respective hosts 11 or various groupings of hosts 11. In addition, either or both of the local storage facility 12L and remote storage facility 12R may include a plurality of disk storage subsystems 23L, 23R and may include a plurality of disk adapters 22L and 22R therefor. In addition, the local storage facility 12L may be connected to a plurality of remote storage facilities 12R to which the remote adapter 24L is connected; alternatively, the local storage facility 12L may include a plurality of remote adapters each connected to one of the remote storage facilities 12R.

In addition, although the invention has been described in connection with local and remote storage facilities, it will be appreciated that the arrangement for transferring data from a source to a destination, and providing an indication that respective portions of the data may be selectively ignored during generation of a CRC value to verify that it was properly received, may be useful in connection with data transfer other types of devices.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A data transfer arrangement for transferring data from a source device to a destination device, the data transfer arrangement comprising:

A. a source interface module associated with the source device, the source interface module being configured to
  (i) receive a data block, the data block including a data portion containing the data to be transferred, and a padding portion containing padding, and
  (ii) transfer the data block to the destination device along with
    (a) a check portion including a source check value, the source check value being a selected function of the data contained in the data portion and selectively the padding contained in the padding portion and
    (b) a check indication indicating whether the check value is the selected function of
      (I) the data contained in the data portion alone, or
      (II) the data contained in the data portion and the padding contained in the padding portion; and
B. a destination interface module associated with the destination device, the destination interface module being configured to
  (i) receive the data block and the check indication from the source interface module;
  (ii) generate a destination check value that is the selected function of
    (a) the data contained in the portion alone, or
    (b) the data contained in the data portion and the padding contained in the padding portion,
    in conformity with the check indication, and
  (iii) using the source and destination check values, determine whether the data block was correctly received.

2. A data transfer arrangement as defined in claim 1 in which the destination interface module is further configured to provide a notification to the source interface module based on whether the destination interface module correctly received the data block.

3. A data transfer arrangement as defined in claim 1 in which the source interface module is further configured to generate the source check value for transfer in the check portion.

4. A data transfer arrangement as defined in claim 1 in which the source device also includes a memory subsystem configured to store the data block, the source interface module being configured to receive the data block by retrieving the data block from the memory subsystem.

5. A data transfer arrangement as defined in claim 1 in which the destination interface module is further configured to store the data block in a memory subsystem included in the destination device if it determines that the data block was correctly received.

6. A source interface for use in connection with a data transfer arrangement for transferring data from a source device to a destination device, the source interface module being associated with the source device, the source interface module comprising:
   (A) a data block receiver module configured to receive a data block, the data block including a data portion containing the data to be transferred, and a padding portion containing padding, and
   (B) a data block transfer module configured to transfer the data block to the destination along with
      (i) a check portion including a source check value, the source check value being a selected function of the data contained in the data portion and selectively the padding contained in the padding portion and
      (ii) a check indication indicating whether the check value is the selected function of
         (a) the data contained in the data portion alone, or
         (b) the data contained in the data portion and the padding contained in the padding portion.

7. A source interface as defined in claim 6 further comprising a source check value generator module configured to generate the source check value for transfer in the check portion.

8. A source interface as defined in claim 6 in which the source device also includes a memory subsystem configured to store the data block, the source interface module being configured to receive the data block by retrieving the data block from the from the memory subsystem.

9. A destination interface for use in connection with a data transfer arrangement for transferring data from a source device to a destination device, the destination interface being associated with the destination device, the destination interface comprising:
   (A) a data block receiver module configured to receive
      (i) a data block including
         (a) a data portion containing the data to be transferred,
         (b) a padding portion containing padding and
         (c) a check portion including a source check value, the source check value being a selected function of the data contained in the data portion and selectively the padding contained in the padding portion and
      (ii) a check indication indicating whether the check value is the selected function of
         (a) the data contained in the data portion alone, or
         (b) the data contained in the data portion and the padding contained in the padding portion;
   (B) a destination check value generator module configured to generate a destination check value that is the selected function of
      (i) the data contained in the portion alone, or
      (ii) the data contained in the data portion and the padding contained in the padding portion,
      in conformity with the check indication, and
   (C) a data block verification module configured to use the source and destination check values to determine whether the data block was correctly received.

10. A destination interface as defined in claim 9 in which the data block verification module is further configured to generate a notification for transfer to the source device based on whether the data block was correctly received.

11. A destination interface as defined in claim 10 further comprising a memory interface configured to store the data block in a memory subsystem if the data block verification module determines that the data block was correctly received.

12. A method of transferring data from a source device to a destination device, the method comprising the steps of
   A. at the source device:
      (i) receiving a data block, the data block including a data portion containing the data to be transferred, and a padding portion containing padding, and
      (ii) transferring the data block to the destination device along with
         (a) a check portion including a source check value, the source check value being a selected function of the data contained in the data portion and selectively the padding contained in the padding portion and
         (b) a check indication indicating whether the check value is the selected function of
            (I) the data contained in the data portion alone, or
            (II) the data contained in the data portion and the padding contained in the padding portion; and
   B. at the destination device:
      (i) receiving the data block and the check indication from the source device;
      (ii) generating a destination check value that is the selected function of
         (a) the data contained in the portion alone, or
         (b) the data contained in the data portion and the padding contained in the padding portion,
         in conformity with the check indication, and
      (iii) using the source and destination check values, determining whether the data block was correctly received.

13. A method as defined in claim 12 further comprising the step of, at the destination device, providing a notification to the source device as to whether the destination device correctly received the data block.

14. A method as defined in claim 12 further comprising the step of, at the source device, generating the source check value for transfer in the check portion.

15. A method as defined in claim 12 in which the receiving step at the source device includes the step of retrieving the data block from a memory subsystem.

16. A method as defined in claim 15 further including the step of, at the destination device, store the data block in a memory subsystem if it determines that the data block was correctly received.

17. A method of operating a source interface for use in connection with a data transfer arrangement for transferring data from a source device to a destination device, the source interface module being associated with the source device, the method including the steps of:
   (A) receiving a data block, the data block including a data portion containing the data to be transferred, and a padding portion containing padding, and (B) transferring the data block to the destination along with
  (i) a check portion including a source check value, the source check value being a selected function of the data contained in the data portion and selectively the padding contained in the padding portion and
  (ii) a check indication indicating whether the check value is the selected function of
    (a) the data contained in the data portion alone, or
    (b) the data contained in the data portion and the padding contained in the padding portion.

18. A method as defined in claim 7 further comprising a source check value generation step including the step of generating the source check value for transfer in the check portion.

19. A method as defined in claim 18 in which the source device also includes a memory subsystem configured to store the data block, the receiving step including the step of retrieving the data block from the from the memory subsystem.

20. A method of operating a destination interface for use in connection with a data transfer arrangement for transferring data from a source device to a destination device, the destination interface being associated with the destination device, the destination interface comprising:
  (A) a data block receiving step including the step of receiving
    (i) a data block including
      (a) a data portion containing the data to be transferred,
      (b) a padding portion containing padding and
      (c) a check portion including a source check value, the source check value being a selected function of the data contained in the data portion and selectively the padding contained in the padding portion and
    (ii) a check indication indicating whether the check value is the selected function of
      (a) the data contained in the data portion alone, or
      (b) the data contained in the data portion and the padding contained in the padding portion;
  (B) a destination check value generation step including the step of generating a destination check value that is the selected function of
    (i) the data contained in the portion alone, or
    (ii) the data contained in the data portion and the padding contained in the padding portion,
    in conformity with the check indication, and
  (C) a data block verification step including the step of using the source and destination check values to determine whether the data block was correctly received.

21. A method as defined in claim 20 in which the data block verification step further includes the step of generating a notification for transfer to the source device based on whether the data block was correctly received.

22. A method as defined in claim 21 further including the step of storing the data block in a memory subsystem if, during the data block verification step, it was determining that the data block was correctly received.

23. A computer program product for use in connection with at least one programmable device to provide a data transfer arrangement for transferring data from a source device to a destination device, the computer program product comprising a device-readable medium having encoded thereon
  A. a source interface module associated with the source device, the source interface module being configured to enable the at least one programmable device to
    (i) receive a data block, the data block including a data portion containing the data to be transferred, and a padding portion containing padding, and
    (ii) transfer the data block to the destination device along with
      (a) a check portion including a source check value, the source check value being a selected function of the data contained in the data portion and selectively the padding contained in the padding portion and
      (b) a check indication indicating whether the check value is the selected function of
        (I) the data contained in the data portion alone, or
        (II) the data contained in the data portion and the padding contained in the padding portion; and
  B. a destination interface module associated with the destination device, the destination interface module being configured to enable the at least one programmable device to
    (i) receive the data block and the check indication from the source interface module;
    (ii) generate a destination check value that is the selected function of
      (a) the data contained in the portion alone, or
      (b) the data contained in the data portion and the padding contained in the padding portion,
      in conformity with the check indication, and
    (iii) using the source and destination check values, determine whether the data block was correctly received.

24. A computer program product as defined in claim 23 in which the destination interface module is further configured to enable the at least one programmable device to provide a notification to the source interface module based on whether the destination interface module correctly received the data block.

25. A computer program product as defined in claim 23 in which the source interface module is further configured to enable the at least one programmable device to generate the source check value for transfer in the check portion.

26. A computer program product as defined in claim 23 in which the source device also includes a memory subsystem configured to enable the at least one programmable device to store the data block, the source interface module being configured to enable the at least one programmable device to receive the data block by retrieving the data block from the memory subsystem.

27. A computer program product as defined in claim 23 in which the destination interface module is further configured to enable the at least one programmable device to store the data block in a memory subsystem included in the destination device if it determines that the data block was correctly received.

28. A computer program product for use in connection with a programmable device to facilitate transfer of data from a source device to a destination device, the computer program product being associated with the source device, the computer program product comprising a device-readable medium having encoded thereon:
  (A) a data block receiver module configured to enable the at least one programmable device to receive a data block, the data block including a data portion containing the data to be transferred, and a padding portion containing padding, and
  (B) a data block transfer module configured to enable the at least one programmable device to transfer the data block to the destination along with (i) a check portion including a source check value, the source check value being a selected function of the data contained in the data portion and selectively the padding contained in the padding portion and (ii) a check indication indicating whether the check value is the selected function of (a) the data contained in the data portion alone, or (b) the data contained in the data portion and the padding contained in the padding portion.

29. A computer program product as defined in claim 28 further comprising a source check value generator module configured to enable the at least one programmable device to generate the source check value for transfer in the check portion.

30. A computer program product as defined in claim 28 in which the source device also includes a memory subsystem configured to store the data block, the computer program product being configured to enable the at least one programmable device to receive the data block by retrieving the data block from the from the memory subsystem.

31. A computer program product for use in connection with a data transfer arrangement for transferring data from a source device to a destination device, the computer program product being associated with the destination device, the computer program product comprising a device-readable medium having encoded thereon:

(A) a data block receiver module configured to enable the at least one programmable device to receive (i) a data block including (a) a data portion containing the data to be transferred, (b) a padding portion containing padding and (c) a check portion including a source check value, the source check value being a selected function of the data contained in the data portion and selectively the padding contained in the padding portion and (ii) a check indication indicating whether the check value is the selected function of (a) the data contained in the data portion alone, or (b) the data contained in the data portion and the padding contained in the padding portion;

(B) a destination check value generator module configured to enable the at least one programmable device to generate a destination check value that is the selected function of (i) the data contained in the portion alone, or (ii) the data contained in the data portion and the padding contained in the padding portion, in conformity with the check indication, and (C) a data block verification module configured to enable the at least one programmable device to use the source and destination check values to determine whether the data block was correctly received.

32. A computer program product as defined in claim 31 in which the data block verification module is further configured to enable the at least one programmable device to generate a notification for transfer to the source device based on whether the data block was correctly received.

33. A computer program product as defined in claim 32 further comprising a memory interface configured to enable the at least one programmable device to store the data block in a memory subsystem if the data block verification module determines that the data block was correctly received.

* * * * *